(12) United States Patent
Munz

(10) Patent No.: US 9,745,015 B2
(45) Date of Patent: Aug. 29, 2017

(54) MECHANISM TO FACILITATE BICYCLE DRIFTING

(71) Applicant: David James Munz, Philadelphia, PA (US)

(72) Inventor: David James Munz, Philadelphia, PA (US)

(*) Notice: Subject to any disclaimer, the term of this patent is extended or adjusted under 35 U.S.C. 154(b) by 0 days.

(21) Appl. No.: 15/266,202

(22) Filed: Sep. 15, 2016

(65) Prior Publication Data

US 2017/0158278 A1    Jun. 8, 2017

Related U.S. Application Data

(60) Provisional application No. 62/283,907, filed on Sep. 15, 2015.

(51) Int. Cl.
*B62K 13/00* (2006.01)
*B62K 3/02* (2006.01)
*B62K 23/08* (2006.01)

(52) U.S. Cl.
CPC ............... *B62K 13/00* (2013.01); *B62K 3/02* (2013.01); *B62K 23/08* (2013.01)

(58) Field of Classification Search
CPC ........................................... B62K 13/00
See application file for complete search history.

(56) References Cited

U.S. PATENT DOCUMENTS

| 3,820,820 A * | 6/1974 | Kutz | B62M 1/24 |
| | | | 280/252 |
| 7,694,989 B2 * | 4/2010 | Halpern | B62H 1/00 |
| | | | 280/293 |
| 8,256,784 B2 | 9/2012 | Hadzicki | |

OTHER PUBLICATIONS

Tim Moynihan, Your Next Midlife Crisis Purchase: This Adult-Size Big Wheel, Wired Magazine, Aug. 5, 2013, 1:50pm, online publication at: https://www.wired.com/2013/08/high-roller/.

* cited by examiner

*Primary Examiner* — John Walters
*Assistant Examiner* — James Triggs

(57) ABSTRACT

A Device is fitted to a traditional bicycle to facilitate a riding style in which the rear wheel of the bicycle can slid sideways or drifted in a controlled manner by harnessing the rider's backward pedaling motions to thrust a block of UHMW plastic downward to the road surface.

10 Claims, 7 Drawing Sheets

MECHANISM TO FACILITATE BICYCLE DRIFTING

CROSS-REFERENCE TO RELATED APPLICATIONS

This application claims the benefit of provisional patent application Ser. No. 62/283,907, filled on Sep. 15, 2015 by the present inventor.

FEDERALLY SPONSORED RESEARCH

None.

SEQUENCE LISTING

None.

BACKGROUND OF THE INVENTION—FIELD OF INVENTION

Drifting is a style of riding or driving vehicles in which the available traction of one or more of the rear wheels is exceeded causing the rear of the vehicle to assume a sliding motion while the front tire or tires maintain largely static traction with the road surface. Most drifting is performed with motorized vehicles which have the ability to use engine power to overwhelm available traction between the tires and the road surface. Practitioners of car and motorcycle drifting take great pride in their ability to navigate turns vehicles which would appear to a lay person to be skidding dangerously out of control. Bicycle drifting is extraordinarily difficult because even the strongest cyclist cannot administer sufficient thrust to the rear wheel of a bicycle to cause it to lose traction. Skidding the rear wheel with the rear brake can induce a brief sensation of drifting, but since bicycles do not travel are high speeds the bicycle quickly slows to a stop.

DETAILED DESCRIPTION OF THE INVENTION

To facilitate the drifting of bicycles the available traction of the rear tire to the road surface must be reduced while the front tire of the bicycle must retain most or all of its traction to the road surface. The traction must be reduced in a controlled manner such that the rider can actively add or subtract to the traction of the rear tire to the road surface. If the rider were to lose too much rear wheel traction, the bicycle would be liable to slide out from underneath him in a manner appreciably similar to a bicyclist crashing on a patch of ice. Additionally, the sudden and inadvertent addition of traction to the rear wheel of a sliding bicycle could cause the bicycle to suddenly tip over and crash.

To selectively reduce the traction of the rear tire of the bicycle with the pavement, a block of plastic, likely composed of UHMW Polyethylene is pressed again the pavement in close proximity to the contact point with which the rear tire contacts the pavement. UHMW Polyethylene has both high abrasion resistance and it slides readily on pavement. As the block of UHMW is pressed against the pavement with increasing force the rear tire of the bicycle with gradually be lifted from the road surface. Even before the tire lifts fully from the road, the tire's traction with the road surface will be significantly reduced. Since UHMW slides so well once the traction of the traction tire to the road's surface is sufficiently reduced the rider will be able to controllably drift the rear of the bicycle around turns.

Replacement of the UHMW Polyethylene with other slipper materials or even one or more rolling elements is certainly possible provided they slide readily on the road surface.

The block of UHMW Polyethylene may be pressed against the road surface by any number of mechanisms and energized by either stored energy or the exertions of the bicycle rider. While an electromechanical mechanisms or hand powered mechanism are certainly possible, the rider back pedaling the bicycle's crankset appears to be the ideal method of generated the force and displacement necessary to lift the rear of the bicycle. In one embodiment of the design, a disc with multiple protrusions is affixed to the inside surface of the bicycle's front chain ring. A member with a cavity hooks onto one of the protrusions on the disc when the chain ring is rotated opposite of usual pedaling motion and is moved accordingly toward the ground. As the member moves it down, it in turn pushes downward on an assembly rotating about the rear axle of the bicycle. The assembly rotating about the rear axle of the bicycle has on its end a universal joint of such to which is affixed a block of UHMW plastic which is driven onto the surface of the roadway on which the bicycle is trans versing. Alternative embodiments of this invention in which mechanisms move the UHMW block by capturing the motion of chain ring teeth which rotate about the bicycle's bottom bracket can certainly be easily envisioned. The capacity to engage or disengage the mechanism so that when not engaged the bicycle can freely be backpedaled would make possible sense in some embodiments of the invention.

DRAWINGS—REFERENCE NUMERALS

| | |
|---|---|
| 5-Frame | 9-Handlebars |
| 10-Rear Wheel | 11-Front Wheel |
| 12-Crank | 18-Pedals |
| 22-Connecting Member | 23-Pegged Disc |
| 24-Connecting Rod | 25-UHMW Polyethylene Plastic Block |
| 26-Axis of Rotation | 27-Compression Spring |
| 29-Tension Spring | 30-Slotted Rod |
| 31-Pin | 32-Shoulder Bolt |
| 33-Running Surface | 35-Protruding Feature |

DETAILED DESCRIPTION OF THE DRAWINGS

Figure 1:
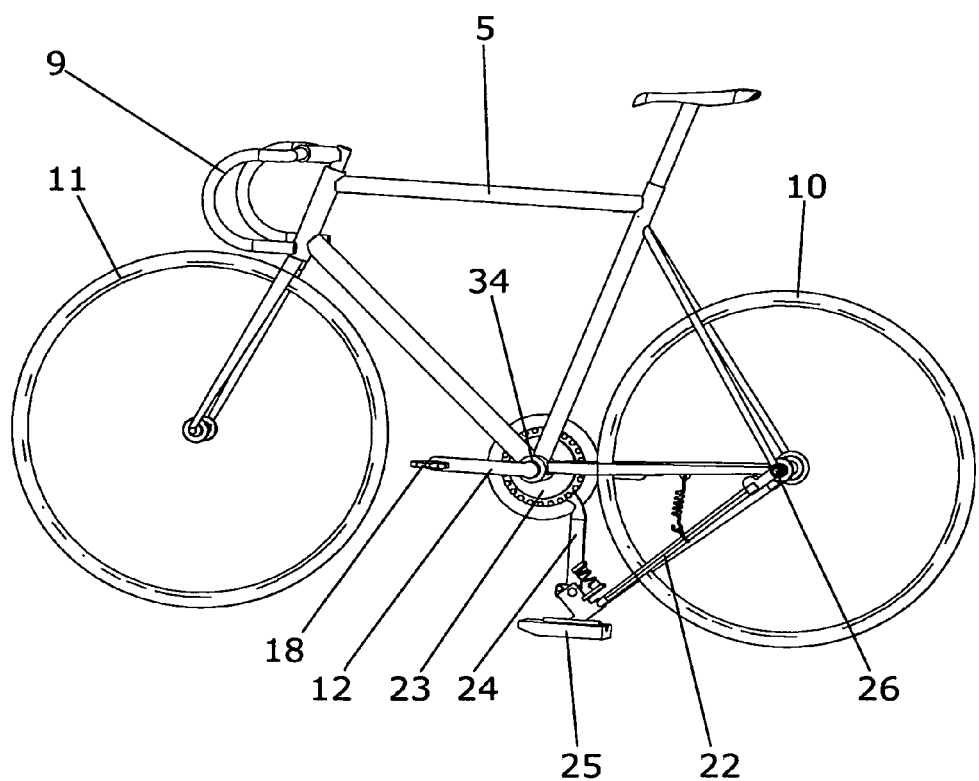
FIG. 1. View of Bicycle fitted with Drifting Mechanism

FIG. 1 depicts a bicycle which includes a front wheel 11 which is steered by handlebars 9 which rotate about in axis in the frame 5. A rear wheel 10 rotates about an axis 26 in the frame 5 and is propelled by pedals 18 which turn a crank 12 which rotates in the frame 5. Rotation of the cranks 12 about the bottom bracket 34 in the frame 5 causes the rotation of the pegged disc 23. Rotations of the pegged disc 23 is translated into the motion of the connecting rod 24.

Motion of the connecting rod 24 ultimately results in the movement of the UHMW Polyethylene block 25 as it is revolved around an axis of rotation 26 and constrained in this motion by the connecting member 22.

Figure 2:
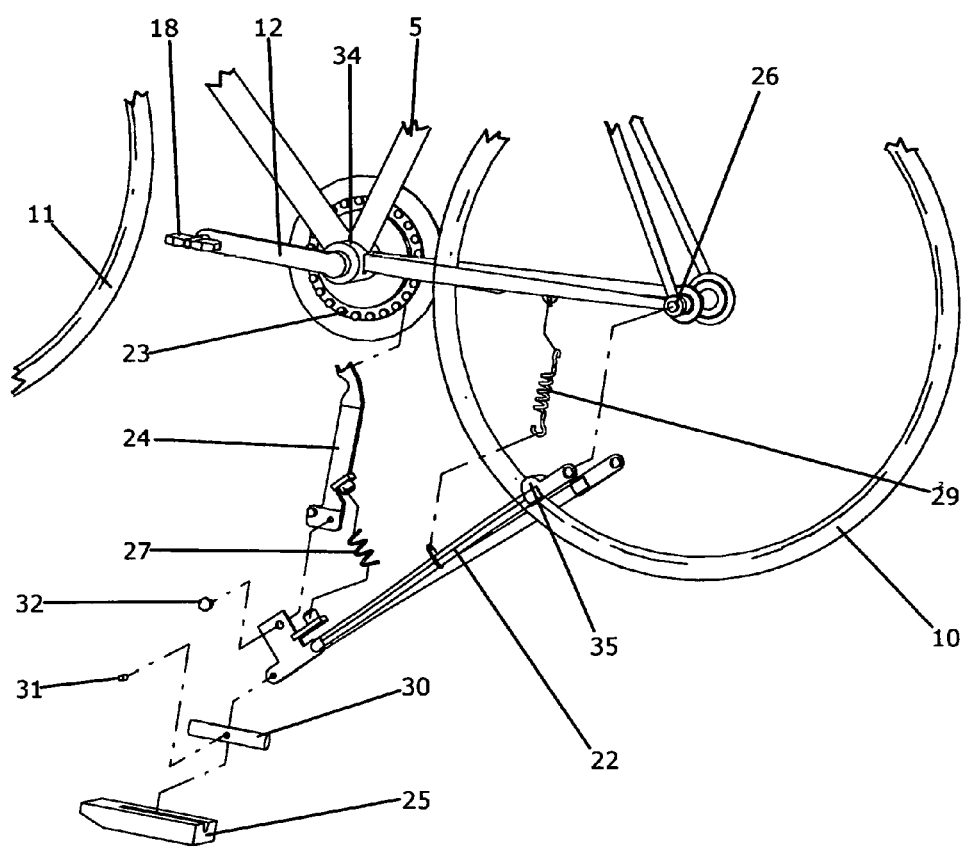
FIG. 2. Exploded Isometric View of Lower Rear Section of Bicycle

FIG. 2 depicts an exploded view of the lower rear portion of the entire bicycle depicted in FIG. 1. Note the small portion of the front wheel 11 visible, the portion of the frame 5 partially visible, and the rear wheel 10 also partially visible. The axis of rotation 26 about which the rear wheel 10 and the connecting member 22 rotate in the frame 5 is clearly visible. Note the protruding feature 35 on the connecting member 22 which contacts the frame 5 when the mechanism is not engaged. Connecting the connecting member 22 to the UHMW polyethylene bock 25 is a slotted rod 30 which is pinned onto the connecting member 22 with a pin 31 on which it may rotate. The UHMW polyethylene block 25 pops onto the slotted rod 30 for easy replacement and it facilitates the rotation of said block to conform to the orientation of the bicycle to the ground or running surface. Pushing the connecting member 22 towards the running surface is the connecting rod 24 which is connected to the connecting member 22 with a shoulder bolt 32. A compression spring 27 pushes the connecting rod 24 in a counter clockwise rotation so that the forked top profile of the connecting rod 24 engages with the pegs protruding from the pegged disc 23. The pegged disc 23 is rotated in a counter clockwise motion about the bottom bracket 34 by the crank 12 onto which the two pedals 18 are affixed to engage and modulate the drifting mechanism. The bottom bracket 34 is firmly fastened into the frame 5. The UHMW polyethylene block 25 is retracted from the road surface by pedaling the crank 12 in a clockwise motion which in turn turns the pegged disc 23 in a clockwise motion. The tensioned spring 29 connected to the frame 5 and the compression member 22 pulls the UHMW polyethylene block 25 upward as the pegged disc 23 is no longer pushing down the connecting rod 24.

Figure 3:
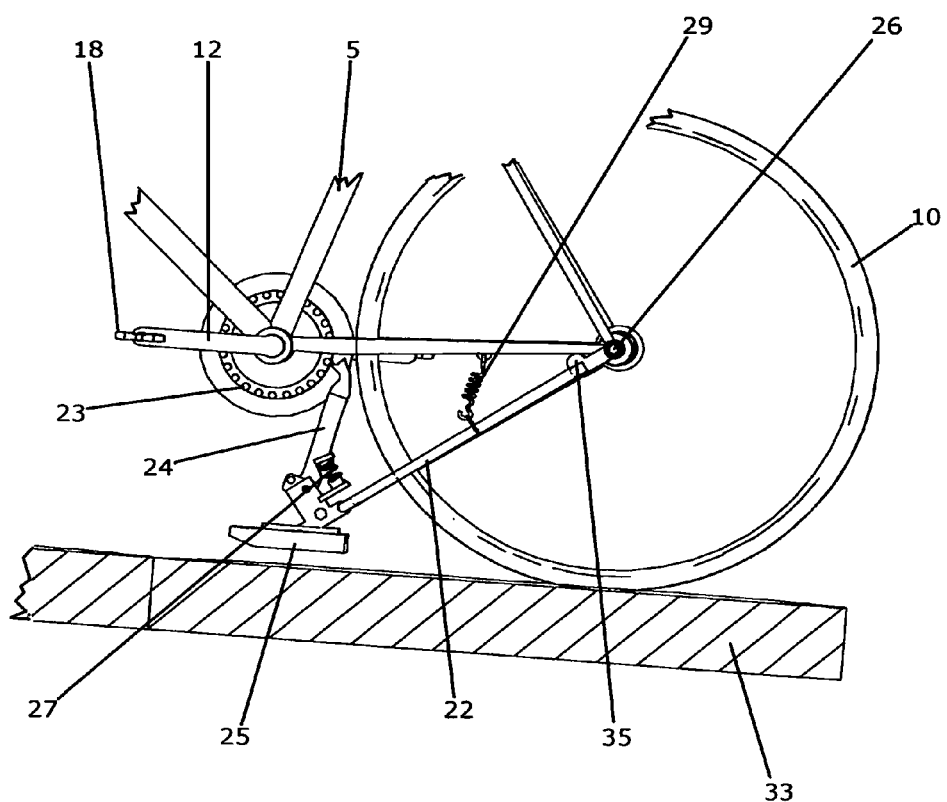
FIG. 3. View of Lower Rear Section of Bicycle, Mechanism Not Engaged

FIG. 3 depicts a view of the lower rear portion of the entire bicycle depicted in FIG. 1. Note the small portion of the rear wheel 10 visible, the portion of the frame 5 partially visible, and a cross section view of the running surface 33 on which the bicycle moves. The axis of rotation 26 about which the rear wheel 10 and the connecting member 22 rotate in the frame 5 is clearly visible. Note the protruding feature 35 on the connecting member 22 is in contact with the frame 5. The connecting member 22 is retracted upward so there is no contact between the UHMW polyethylene bock 25 and the running surface 33. The connecting rod 24 is not engaged to the pegged disc 23 so provided the pegged disc 23 is motionless or not rotated in a counter clockwise rotation the connecting rod 24 will not be pushed downward. Notice that in this orientation the compression spring 24 is compressed as it functions to press the notched top of the compression rod 24 into the pegged disc 23. Rotation of the pegged disc 23 is a result of the rotation of the crank 12 by the two pedals 18.

Figure 4:
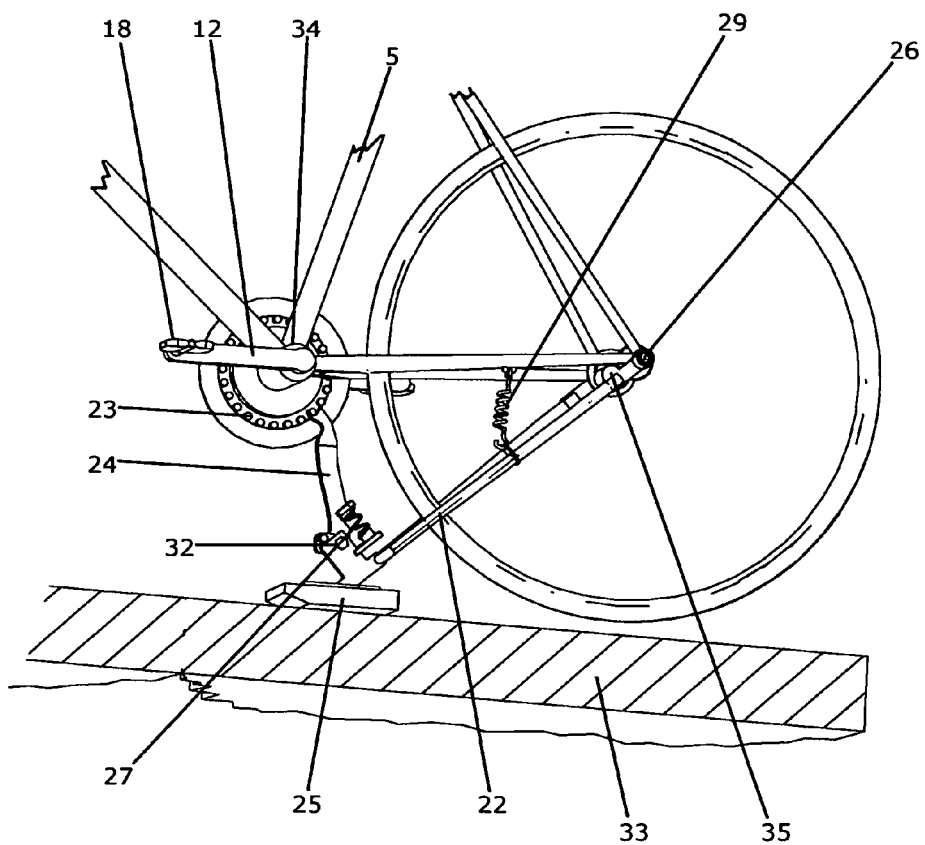
FIG. 4. View of Lower Rear Section of Bicycle, Mechanism Engaged

FIG. 4 is a view of the assembly in FIG. 3 but with the mechanism engaged to lift the rear wheel 10 from the running surface 33 which will allow the rear of the bicycle to drift sideways in relation to the bicycle's forward motion. Note the gap between the protruding feature 35 on the connecting member 22 and the bicycle's frame 5. The gap is opened up by the rotation of the connecting member 22 about an axis of rotation 26. This counter clockwise rotation tensions the tension spring 29 which is connected to the connecting member 22 and the frame 5. The counter clockwise rotation of the connecting member 22 is caused by the downward thrust of the connecting rod 24 to which it is connected by the shoulder bolt 32. The connecting rod is driven downward by its engagement with the pegged disc 23 whose pegs press into the recess in the top of the connecting rod 24. The pegged disc 23 is rotated in a counter clockwise manner and held in this orientation by the rider using the pedals 18 to orient the crank 12 which rotates about the bottom bracket 34.

Figure 5:
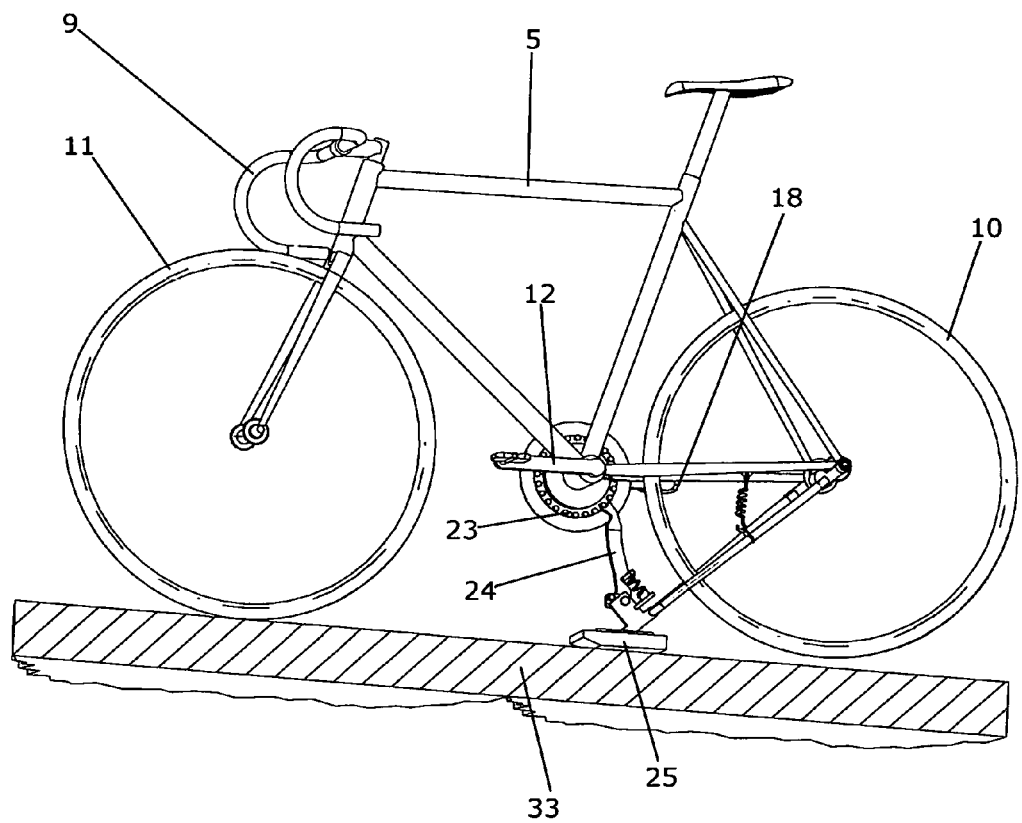
FIG. 5. View of Bicycle with Drifting Mechanism Engaged

FIG. 5 is a full view of the bicycle as it travels on the running surface 33 with the mechanism engaged to lift the rear wheel 10 from the running surface. Notice the significant gap between the rear wheel 10 and the running surface 33. No gap exists between the front wheel 11 and the running surface 33 as they remain in firm contact. Steering motions to the handlebars 9, road surface variations, and the movement of the rider's mass would cause the frame 5 to move somewhat independently of the bicycle's customary path of travel whenever the UHMW polyethylene plastic block 25 is exerting significant pressure on the running surface 33. Note that the rear of the bicycle is essentially supported by the connecting rod 24 and will remain this way as long as the pegged disc 23 is maintained in its orientation by the rider keeping the crank 12 from rotating. Careful pedaling of the pedals 18 allows the rider complete control over how firmly the UHMW polyethylene plastic block is thrust onto the road surface.

Figure 6:
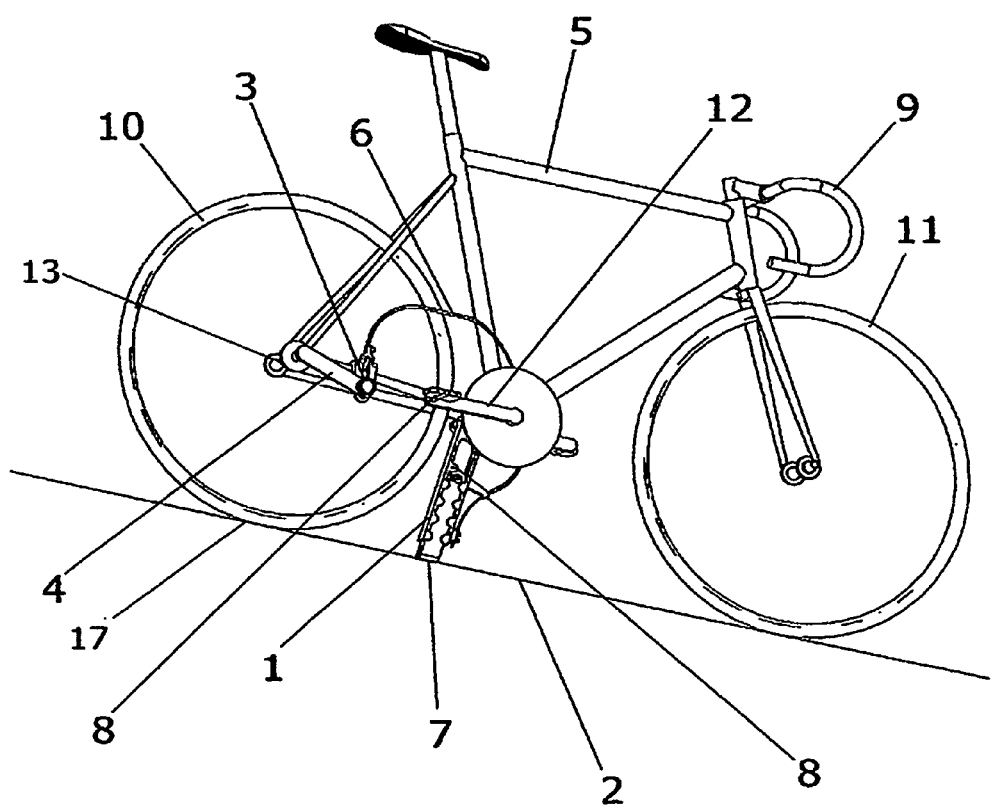

FIG. 6 depicts the bicycle of FIG. 1 but with the peg 3 depressed resulting in the rotation of member 4 about the bicycle's rear axle 13. This motion is transmitted via a cable running in a sheath 6 to the assembly 1. Movement of member 8 presses the UHMW Polyethylene block 7 against the running surface 2 which acts to reduce traction between the rear wheel 10 and the running surface 2 at the contact point 17. Note that the underside of the UHMW Polyethylene block 7 has a curved surface.

Figure 7:
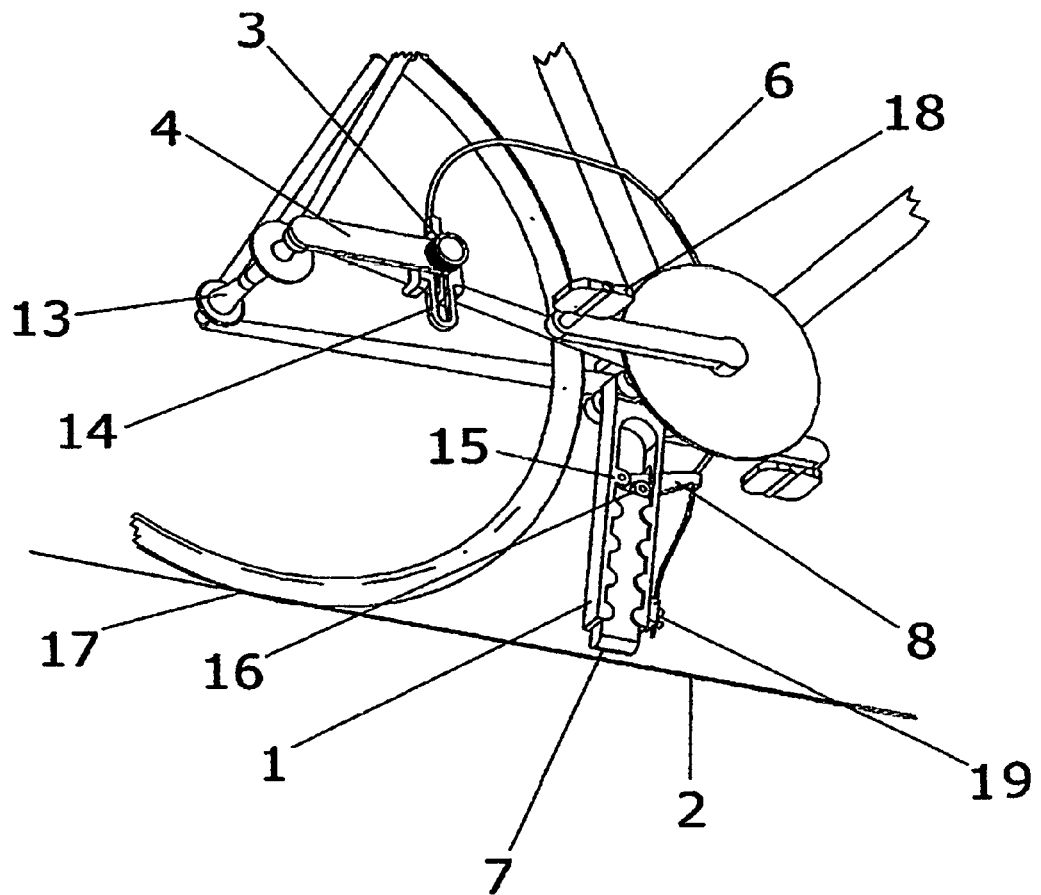

FIG. 7 depicts an expanded view of the mechanism assembled in FIG. 1 with a perspective that better shows the peg 3 against which the ride's foot would press to ultimately move the UHMW Polyethylene block 7. This particular view shows the bracket 14 with which the peg 3 moves in relation to as it rotates as an assembly with member 4 about the rotational axis of the rear axle 13. The rider may press on the peg 3 while their foot is still in contact with the pedal 18. The motion of peg 3 is transmitted through the cable and sheath 6 to the member 8 which rotates about the pivot 15. Rotation of member 8 causes the roller 16 to press against the UHMW Polyethylene block 7 causing it to slide in the assembly 1 and ultimately contact the running surface 2. Note that the underside of the UHMW Polyethylene block 7 has a curved surface.

I claim:

1. A drift bike comprising: a tubular frame connected to a steerable front wheel and a driven rear wheel; a rotatable crank assembly to drive the rear wheel wherein the front wheel and the rear wheel travel on a running surface; a slider element is positioned above the running surface; wherein motion from the rotation of the crank assembly is captured by a mechanism to move the slider element toward the running surface; wherein motion of the slider element toward the running surface brings the slider element and the running surface into contact to diminish contact force between the rear wheel and the running surface; wherein the diminished contact force creates a condition wherein the rear wheel loses traction with the running surface and is slideable on the running surface.

2. A bicycle comprising: a frame connected to a steerable front wheel and a driven rear wheel; a rotatable crank assembly to drive the rear wheel wherein the front wheel and the rear wheel travel on a running surface including a drifting device comprising a slider element positioned above the running surface; wherein motion from the rotation of the crank assembly is captured by a mechanism to move the slider element toward the running surface; wherein motion of the slider element toward the running surface brings the slider element and the running surface into contact to diminish contact force between the rear wheel and the running surface; wherein the diminished contact force creates a condition wherein the rear wheel loses traction with the running surface and is slideable on the running surface.

3. The drift bicycle of claim 1, wherein the slider element that contacts the running surface; has a substantially flat surface facing the running surface that is composed of a material whose coefficient of friction against the running surface is lower than the coefficient of friction generated between the rear wheel and the running surface; and the slider element articulates so that the substantially flat surface assumes a parallel relationship with the running surface.

4. The drift bicycle of claim 1 wherein the slider element has a recess cut in its top surface above the substantially flat lower surface that would contact the running surface wherein the recess cut in top surface is of appropriate dimension to captivate a cylindrically shaped member whose length exceeds the width of its cylindrical dimension; wherein the cylindrically shaped member exist at the base of the mechanism that lowers the slider element onto the running surface; wherein the recess in the slider element contains the cylindrical member in such an orientation that the full length of the cylindrical member is accommodated by the recess and the slider element may rotate around the cylindrically shaped member.

5. The mechanism of claim 1, wherein the motion of the slider element that contacts the running surface is derived from a rotation about the axis of rotation on which the rear wheel of the bicycle rotates in relation to the frame.

6. The drift bicycle of claim 2, wherein the slider element that contacts the running surface; has a substantially flat surface facing the running surface that is composed of a material whose coefficient of friction against the running surface is lower than the coefficient of friction generated between the rear wheel and the running surface; and the slider element articulates so that the substantially flat surface assumes a parallel relationship with the running surface.

7. The drift bicycle of claim 2 wherein the slider element has a recess cut in its top surface above the substantially flat lower surface that would contact the running surface wherein the recess cut in top surface is of appropriate dimension to captivate a cylindrically shaped member whose length exceeds the width of its cylindrical dimension; wherein the cylindrically shaped member exist at the base of the mechanism that lowers the slider element onto the running surface; wherein the recess in the slider element contains the cylindrical member in such an orientation that the full length of the cylindrical member is accommodated by the recess and the slider element may rotate around the cylindrically shaped member.

8. The mechanism of claim 2, wherein the motion of the slider element that contacts the running surface is derived from a rotation about the axis of rotation on which the rear wheel of the bicycle rotates in relation to the frame.

9. The drift bicycle of claim 1, wherein the portion of the slider element that contacts the running surface has a curved profile.

10. The drift bicycle of claim 2, wherein the portion of the slider element that contacts the running surface has a curved profile.

\* \* \* \* \*